United States Patent [19]
Wilton et al.

[11] Patent Number: 5,117,909
[45] Date of Patent: Jun. 2, 1992

[54] WELL CONDUIT SEALANT AND PLACEMENT METHOD

[75] Inventors: Bonsall S. Wilton, McKinney; J. Benjamin Bloys, Plano; Roger D. Bradshaw, Allen; Kenneth R. Riggs, Richardson, all of Tex.

[73] Assignee: Atlantic Richfield Company, Los Angeles, Calif.

[21] Appl. No.: 603,571

[22] Filed: Oct. 25, 1990

[51] Int. Cl.$^5$ .............................................. E21B 29/00
[52] U.S. Cl. ..................................... 166/277; 166/284; 166/372; 166/387
[58] Field of Search ................ 166/277, 284, 370-372, 166/387; 285/351-352, 919, 333-334, 355; 239/9, 10; 29/460, 527.1, 527.2, 530; 411/82, 258

[56] References Cited

U.S. PATENT DOCUMENTS

| | | | |
|---|---|---|---|
| 2,804,147 | 8/1957 | Pistole et al. | 285/15 X |
| 3,101,207 | 8/1963 | Pavel et al. | 285/355 X |
| 3,144,049 | 8/1964 | Ginsburgh | 166/284 |
| 3,315,017 | 4/1967 | Kemp | 285/15 X |
| 3,494,325 | 2/1970 | Magee | 29/460 |
| 3,650,804 | 3/1972 | Parisi | 29/530 X |
| 3,724,549 | 4/1973 | Dill | 166/283 X |
| 4,073,836 | 2/1978 | Harrison et al. | 29/460 X |
| 4,124,253 | 11/1978 | Latiolais et al. | 166/370 X |
| 4,212,966 | 7/1980 | McClain | 528/487 X |
| 4,230,348 | 10/1980 | Moore | 285/297 |
| 4,513,816 | 4/1985 | Hubert | 166/387 X |
| 4,579,668 | 4/1986 | Messenger | 166/294 X |
| 4,582,091 | 4/1986 | Ells | 166/284 X |
| 4,582,551 | 4/1986 | Parkes et al. | 285/15 X |
| 4,708,288 | 11/1987 | Von Eckardstein | 239/9 |
| 4,824,590 | 4/1989 | Roselle | 252/95 X |
| 4,869,321 | 9/1989 | Hamilton | 166/277 |

Primary Examiner—Ramon S. Britts
Assistant Examiner—Roger J. Schoeppel
Attorney, Agent, or Firm—Michael E. Martin

[57] ABSTRACT

Gas leakage from oil wells through casing thread connections and other small leakage spaces is reduced or eliminated by injecting into the lift gas flowstream a sealant composition comprising a carrier liquid, such as diesel fuel or water, an ethoxylated phenol surfactant and particulate silica and/or Gilsonite. A liquid sealant composition is injected into oil wells on artificial gas lift comprising arctic diesel fuel, a surfactant and solubilized Gilsonite in a weight ratio of about 10:1 diesel fuel to Gilsonite and diesel fuel to surfactant, respectively. Effective reduction in leakage flow rates is obtained over a relatively short time period (one to ten hours).

15 Claims, 3 Drawing Sheets

WELL CONDUIT SEALANT AND PLACEMENT METHOD

BACKGROUND OF THE INVENTION

1. Field of the Invention

The present invention pertains to a sealant and placement technique for sealing thread leaks and other relatively minute leakage points, particularly in oil and gas well tubing and casing strings.

2. Background

Oil and gas well conduits, such as casing or production tubing, frequently develop undesired fluid leakage points, such as at the threaded connections between tubing or casing sections, leaks across packers and other undesired openings. One particularly troublesome leakage problem occurs with oil wells which are being produced using gas lift. In such an arrangement, a gas, such as natural gas produced from the oil field being produced, is circulated down the casing annulus and through spaced-apart valves in the production tubing string to assist in lifting the crude oil through the tubing string. If gas leaks through the casing threaded connections into the outer annulus, serious fluid control problems may occur. In certain arctic oil wells, for example, the lifting gas may leak into an outer annulus which is filled with an insulating fluid, adversely reacting with that fluid to create voids and channels thereby destroying the insulating capability of the fluid. The leaking gas also pressurizes the wellhead, creating an operational safety hazard that requires frequent bleed-down and limiting the artificial lift gas injection pressure. Lower gas injection pressure, of course, results in reduced oil production.

Repair or replacement of casing and tubing strings to correct for leaking joints is a costly and time-consuming task. Pulling and repairing several thousand feet of tubing or casing may cost several million dollars and, of course, results in lost well production during the repair process.

One technique for repairing small holes and other leakage points in well conduits is described in U.S. Pat. No. 4,869,321, issued Sep. 26, 1989 to B. E. Hamilton. The composition and method described in the Hamilton reference is not, however, applicable to all well conduit leakage problems. The aforementioned situation wherein leakage occurs from the gas annulus through casing connections cannot benefit from the Hamilton technique or composition. One aspect of the problem of plugging small leaks is to in some way provide a sealant which may be carried into the leakage area, which may be a minute space, while at the same time being capable of plugging the leakage area. These two requirements are normally at cross purposes with one another but have been met by the unique composition and method of the present invention.

SUMMARY OF THE INVENTION

The present invention provides a method and composition for sealing threaded connections and other fluid leakage points in conduits and casings, particularly those used in oil and gas well structures. In accordance with an important aspect of the present invention, there is provided a sealant composition which may be carried as an atomized liquid in a gas or other fluid stream into a small leakage area wherein the sealant is of sufficient fluidity so as to migrate into small spaces but is also capable of eventually sealing or plugging the spaces.

The sealant is advantageously provided in the form of a multi-component liquid which is capable of being atomized in a hydrocarbon or other gas stream, is capable of migrating into small leakage spaces, such as the spaces formed between externally and internally threaded members which have been coupled together, and finally plugging the leakage spaces. The multi-component sealant fluid preferably comprises a carrier liquid, a surfactant and one or more types of minute particulates which act as a leakage space plugging or plating agent.

The present invention further contemplates a sealant which comprises a carrier liquid, a surfactant and a particulate material such as Gilsonite, hydrophobic and hydrophilic fume silica. Carrier liquids preferably include diesel fuel, glycerols, polyglycol, water, mineral oil and octane. The present invention further contemplates a sealant composition, which includes a surfactant, such as ethoxylated phenols.

Still further, the present invention contemplates a sealant composition, particularly adapted for use in sealing oil and gas well threaded joints, which composition is adapted to be carried by a fluid stream, such as a gas lift flowstream, and comprising a carrier liquid in the form of arctic diesel fuel, a surfactant and pulverized Gilsonite.

In accordance with another important aspect of the present invention, there is provided a method for sealing thread leaks and other small leaks in tubing strings and casing strings in wells wherein a unique sealant is carried downhole with a gas flowstream and is operable to plug small leaks in threaded connections, such as the threaded connections between casing sections in the wellbore.

Those skilled in the art will recognize other advantages and superior features of the present invention upon reading the detailed description which follows in conjunction with the drawing.

DESCRIPTION OF PREFERRED EMBODIMENTS

Figure 1:
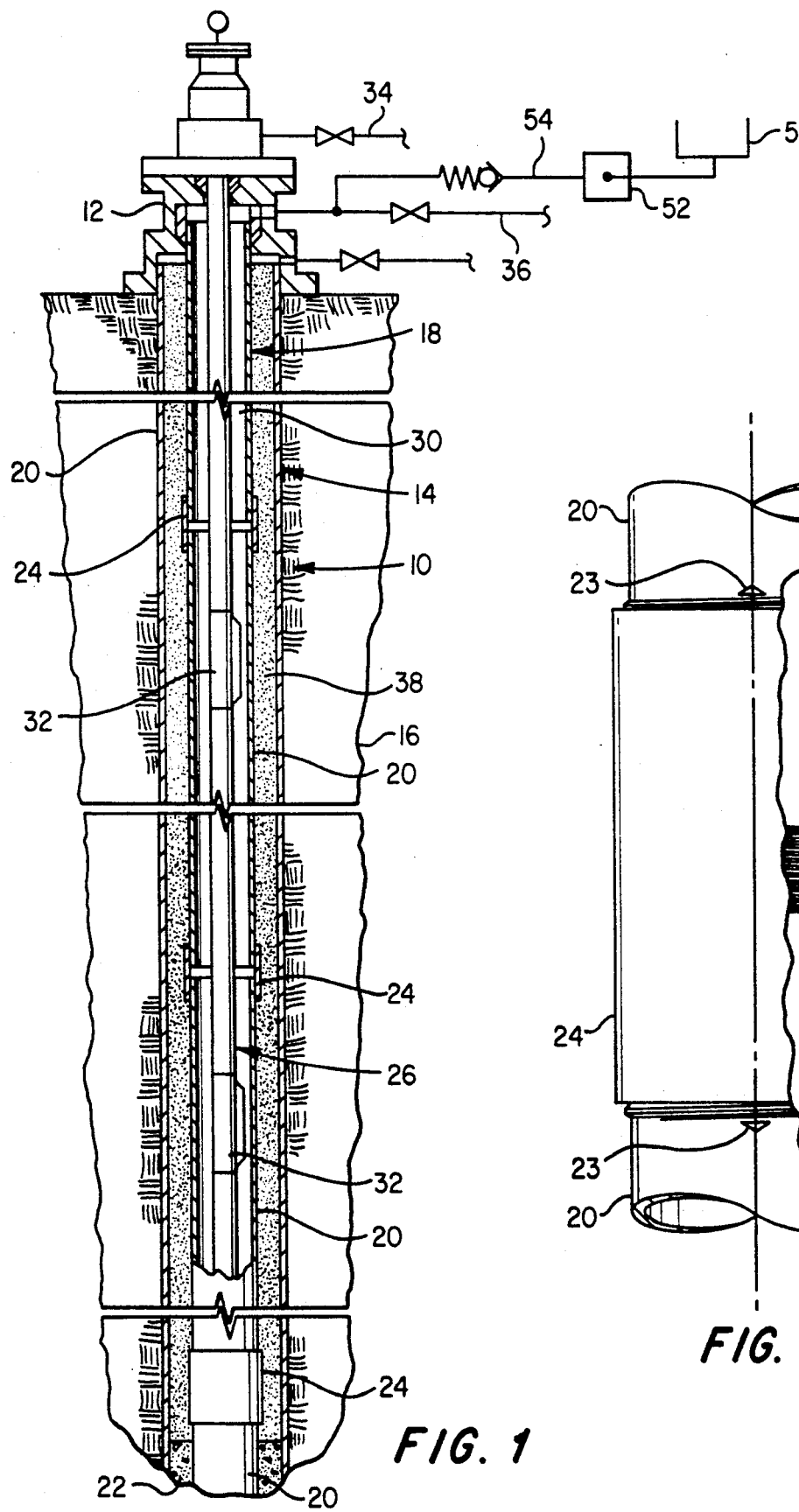
FIG. 1 is a schematic diagram of an oil well adapted for lifting crude oil by gas lift and which is also adapted for sealing leaks in threaded connections between casing or tubing sections.

In the description which follows, like parts are marked throughout the specification and drawing with the same reference numerals, respectively. The drawing figures are not necessarily to scale in the interest of clarity and conciseness.

FIG. 1 illustrates a typical oil well, or similar fluid-producing well, generally designated by the numeral 10. The well 10 is atypical in that it is specially adapted for installation in arctic areas such as the North Slope oil fields of Alaska. The well 10 includes a wellhead 12, which is connected to an outer tubular casing 14 extending within an earth formation 16, and an inner casing, generally designated by the numeral 18.

The casing 18 is made up of conventional end-to-end coupled tubular casing sections 20 extending from the wellhead 12 to a point below a seal or plug 22 extending between the casings 14 and 18. The casing sections 20 are interconnected by threaded coupling members 24 of conventional design and illustrated in further detail in FIG. 2. The well 10 further includes a production tubing string, generally designated by the numeral 26, which has been adapted to produce fluids from a subterranean formation zone, not shown, with the assistance of so-called gas lift. Gas, such as natural gas or methane, is injected down the annular space 30 between the casing 18 and the tubing string 26 and flows into the interior of the tubing string through suitable gas lift valves which are disposed in spaced-apart devices commonly known as gas lift mandrels 32 interposed in the tubing string 26. The injected gas flows into the interior of the tubing string 26 and assists in lifting crude oil through the tubing string to a flowline 34 connected to the wellhead 12. Gas is injected into the space 30 by way of a gas supply conduit 36 from a source, not shown. In the arrangement of the well 10, an insulating fluid, generally designated by the numeral 38, is interposed in the annular space between the casings 14 and 18 to prevent thawing of the permafrost portion of the formation 16 which, in certain arctic areas, may extend as deep as 2,000 feet from the surface. The insulating fluid 38 may comprise a composition, including diesel fuel and certain clays, which forms a viscous slurry which serves to minimize the transfer of heat from the produced oil flowing through the tubing string 26 to the earth formation 16.

Figure 2:
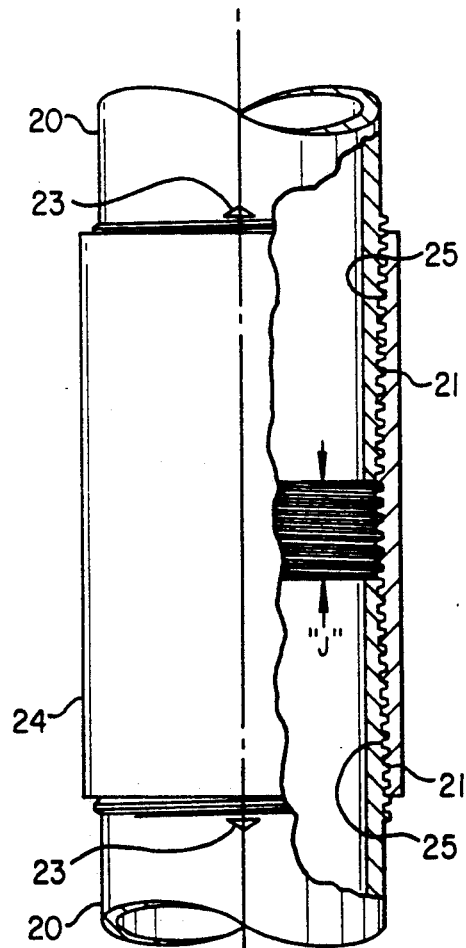
FIG. 2 is a view, partially sectioned, of a conventional threaded connection between casing sections for oil and gas well applications.

Referring briefly to FIG. 2, oil well casing connections are typically made up using an API (American Petroleum Institute) buttress-type thread formed as an external threaded region 21 on the casing sections 20 and as opposed internal threads 25 on the coupling section 24. Such threaded connections between adjacent casing sections 20 are made up to a position of the coupling 24 with respect to the coupled casing section 20 as typically indicated by a triangular mark 23 formed on the casing section. Tightening the coupling 24 up to the base of the triangular mark 23 is usually considered as guidance for sufficiently tight make-up of the coupling to the casing section. Typically, a thixotropic pipe lubricant/sealant is applied to the threads before making up the threaded connection, but if any gap is formed between the threads, a hydrocarbon gas will eventually migrate through and tend to deteriorate some conventional pipe sealant or lubricant compositions. Accordingly, threaded connections between casing sections can be common fluid leakage points and, in wells which are being produced with artificial lift by high pressure gas such as described above, leakage of gas into the area outside of the casing conducting the gas may cause serious operational problems and deterioration of such substances as insulating fluids of the type described above. Such leakage paths are usually relatively minute, and the application to the leak of a sealant comprising particulate solids in some type of carrier fluid is not easily accomplished.

However, in accordance with the present invention, there has been developed a fluid leak sealant and method which has proven to be successful in at least sealing threaded connections between casing sections in oil wells. The unique sealant preferably comprises a carrier liquid, a surfactant and a sealant material comprising small particulates, at least some of which preferably solubilize in the carrier liquid for improved transport into the leakage space. The sealant then comes out of solution upon evaporation of the carrier liquid. The carrier liquid is exposed to a flowing gas transport stream which, upon deposition of the sealant in the leakage space, continues to aid in evaporation or separation of the carrier liquid from the sealant material.

The sealant composition is entrained in the gas stream, such as in the exemplary well 10, by injecting a measured quantity or rate of sealant into the lift gas flowstream from a source 50 by way of a pump 52 and a conduit 54 connected to the gas injection conduit at the wellhead 12 or slightly upstream of the wellhead in the gas injection conduit. The injected sealant is carried by the artificial lift gas stream down through the annular space 30, where it coats the inner walls of the casing 20 and coats the threads 25 of the coupling sections 24 in the so-called "J" region between the opposite ends of the coupling sections 20, as indicated in FIG. 2. If gas is leaking through the threaded connections between the threads 21 and 25, the inventive sealant will be conveyed into and deposited in the thread leak area. Of course, pressure in the annular space, such as occupied by the insulating fluid 38 in the well 10, must be reduced to maintain a sufficient differential pressure to obtain enough flow of the sealant so that it will deposit in the thread leak spaces.

It has been determined that a suitable sealant should have the properties of low surface tension and viscosity, compatibility with thread sealant and lubricating compositions applied to the threaded connections at the time of make-up of same, the capability of being delivered by a gas flow stream, non-damaging to wellbore components such as gas lift valves and associated mechanism, the ability to perform in an arctic environment (as the case may require) and compatibility with the fluids produced through the tubing string, such as the tubing string 26. These criteria have led to the development of a composition comprised of at least three components, including a carrier fluid, a surfactant and small particulates entrained therein and operable to act as a plugging or plating agent.

In pursuing the present invention, a hydrocarbon carrier liquid/silica composition has been studied. In particular, three-component compositions comprising submicron particle size silica, an oil-soluble nonionic surfactant and a hydrocarbon carrier liquid have been prepared and reviewed. A composition was made up of silica, having a particle size of about 0.014 microns, and an approximate BET surface area of 200 meters square/g, an oil-soluble, nonionic surfactant such as an octylphenol ethoxylate with a mean of 1.5 ethoxy groups per molecule, an HLB of 2.8 and a molecular weight of 272.4, sold under the trademark IGEPAL CA-210 (by Rhone-Poulenc, Inc. Winder, GA) and octane. A preferred composition included a weight ratio of about 10:1 for the carrier liquid with respect to the silica and a weight ratio of about 25:1 of carrier liquid with respect to the surfactant. This composition forms a stable dispersion with very slow sedimentation rate. If left undisturbed for approximately 24 hours, substantial sediment will form, but the sediment is easily redispersed with only slight agitation. The composition exhibits shear thinning behavior but does not become gel-like in the absence of agitation. The viscosity in the absence of any shear is very close to that of the carrier liquid.

A second composition comprising silica, diesel fuel and an ethoxylated octylphenol surfactant was prepared using the weight ratios for the first-mentioned composition. This second composition forms a low viscosity, fairly stable dispersion. After 48 hours, the settled silica can be redispersed, but only after fairly vigorous agitation. It is preferred that the surfactant be added to the diesel before the silica, as the silica plus only the diesel makes a relatively thick gel. As with the first composition, the addition of the surfactant brings the viscosity very close to that of the diesel fuel itself.

Formulations of a suspension of submicron silica in water and glycerol with a single surfactant additive and a polyelectrolyte were also prepared and reviewed. The most stable dispersion contains glycerol, polyelectrolyte and surfactant. A composition based on a 10:1 weight ratio of water to silica and a 16:1 ratio of water to surfactant forms a fairly stable foam of moderate volume on vigorous agitation. The surfactant comprises a nonylphenol polyethoxylate with a mean of 30 ethoxy groups per molecule, a molecular weight of 1540 and an HLB of 17.2. Such a surfactant is manufactured by Rhone-Poulenc, Inc. as their IGEPAL CO-880. More stable dispersions of silica and water were obtained in a 10:1 weight ratio of water to silica by using Rhone-Poulenc's Triton X-114 octylphenol polyethoxylate surfactant in a weight ratio of 5:1 to 20:1 of water to surfactant and with an additive of sulfonated polystyrene in a weight ratio of 10:1 water to additive. Although the aforementioned compositions appear to provide wide dispersibility of the silica and water and high absorptivity of the nonionic surfactants on the silica surface, leakage tests conducted with these compositions showed that they were somewhat inferior to a composition described below.

In an effort to find a sealant composition which may be readily made up from materials available in many oil well locations, it has been determined to attempt to rely on a diesel fuel or a similar hydrocarbon as a carrier fluid. The silica particles tend to form a somewhat more viscous sealant composition than is desired, particularly for arctic operations. Accordingly, a further effort to obtain a suitable sealant was realized with a composition comprising a carrier liquid in the form of arctic diesel fuel, a surfactant of the ethoxylated phenol type and a particulate formed of a hydrocarbon resin. One form of the last-mentioned ingredient, which has been shown to be particularly suitable, is Gilsonite, a hydrocarbon resin which is mined from the Uintah Basin of Eastern Utah in a form which looks very similar to coal or hard asphalt and which may be crushed into a fine powder. Gilsonite is available from the American Gilsonite Company, Salt Lake City, Utah.

Tests were conducted with sealant compositions comprising about 10:1 weight ratio of diesel fuel to Gilsonite and an ethoxylated phenol surfactant, such as IGEPAL RC-520, available from Rhone-Poulenc, Inc. Particle size of the Gilsonite averaged less than about 5.0 microns. Sealant compositions having a weight ratio of carrier liquid (diesel fuel) to surfactant of about 9:1 appear to include satisfactory amounts of surfactant.

Leakage tests were conducted on a test rig comprising coupled sections of API 9.625-inch diameter casing oriented vertically, closed at both ends and injected with nitrogen gas at about 1600 psig. The test sealant compositions were injected into the upper end of the casing test rig. Combined gas and sealant fluid leaking through the upper and lower coupling connections or joints was collected and flow rates measured to determine, on a comparative basis, the performance of the various sealant compositions.

Figure 3:
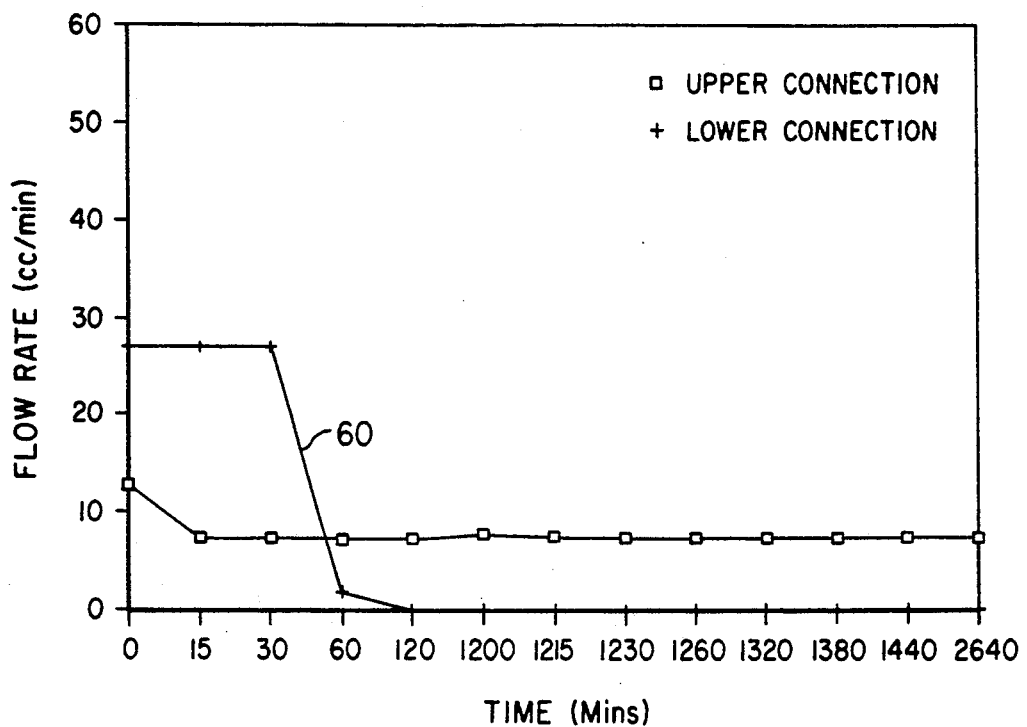
FIGS. 3 through 6 are diagrams showing the relative sealing capability of certain sealant compositions in accordance with the present invention.
Figure 4:
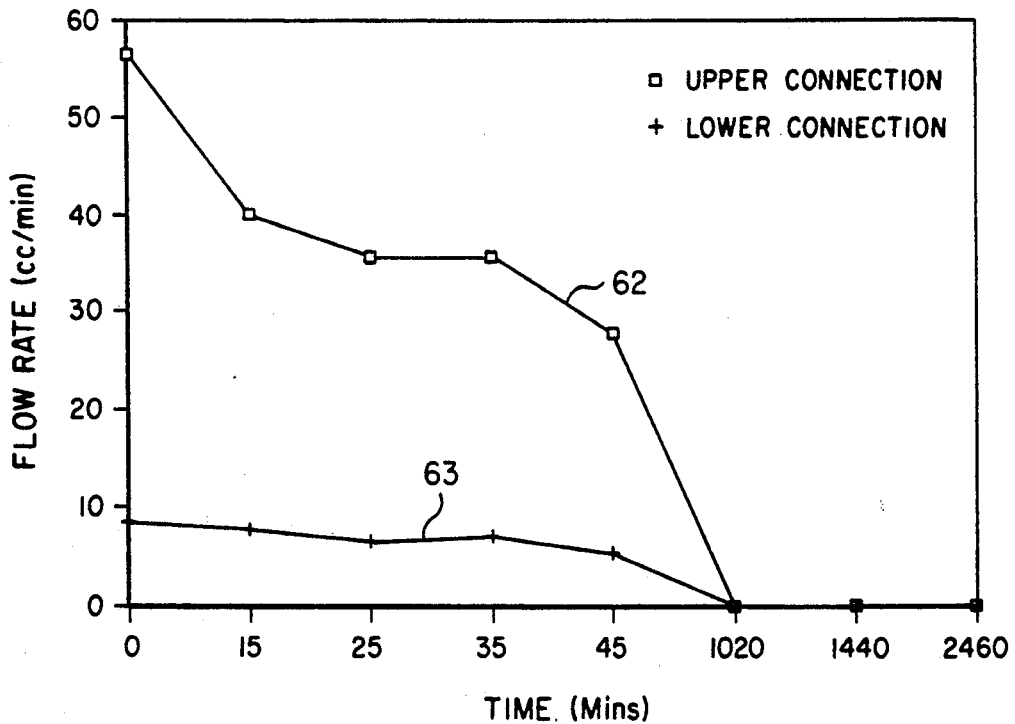

Referring to FIG. 3, there is illustrated a graph depicting time versus the leak rate of fluid through the upper and lower connections between casing sections and a coupling of the test rig. Test samples made up of 946.4 ml diesel fuel, 94.64 g silica and 45.43 g of IGEPAL CO-430 surfactant produced a reduction in leak rate to effectively zero in the lower connection within about two hours, as indicated by the line 60 in FIG. 3. The lines 62 and 63 in FIG. 4 indicate the leakage rate for a sealant composition made up of batches of 946.4 ml diesel fuel, 94.64 g of Gilsonite, 47.32 g silica and 100.32 g IGEPAL RC-520 and 22.7 g of IGEPAL CO-430 surfactants. The Gilsonite and silica were of about 5.0 micron or less particle size. This composition showed a much longer time to achieve zero leakage for the same injection rate in the aforementioned test rig.

Figure 5:
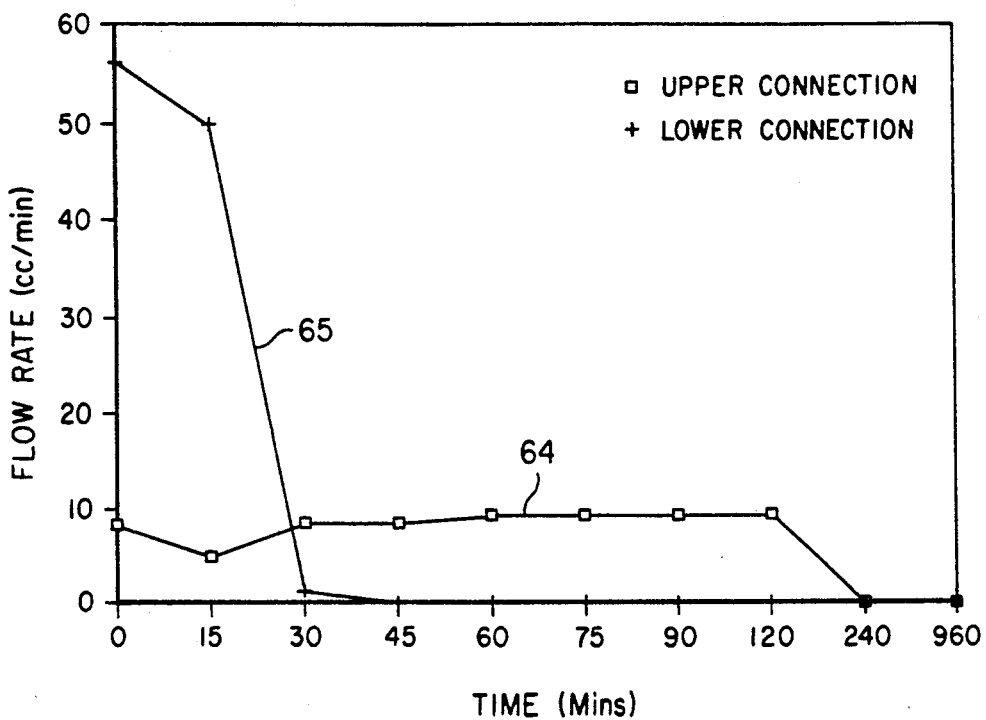

Referring to FIG. 5, lines 64 and 65 indicate the leakage rate from the upper and lower coupling connections of the test rig achieved with a sealant composition comprising 946.4 ml diesel fuel, 94.64 g Gilsonite and 100.32 g of IGEPAL RC-520 surfactant. This sealant achieved a zero leakage rate in less than four hours in the test rig.

Figure 6:
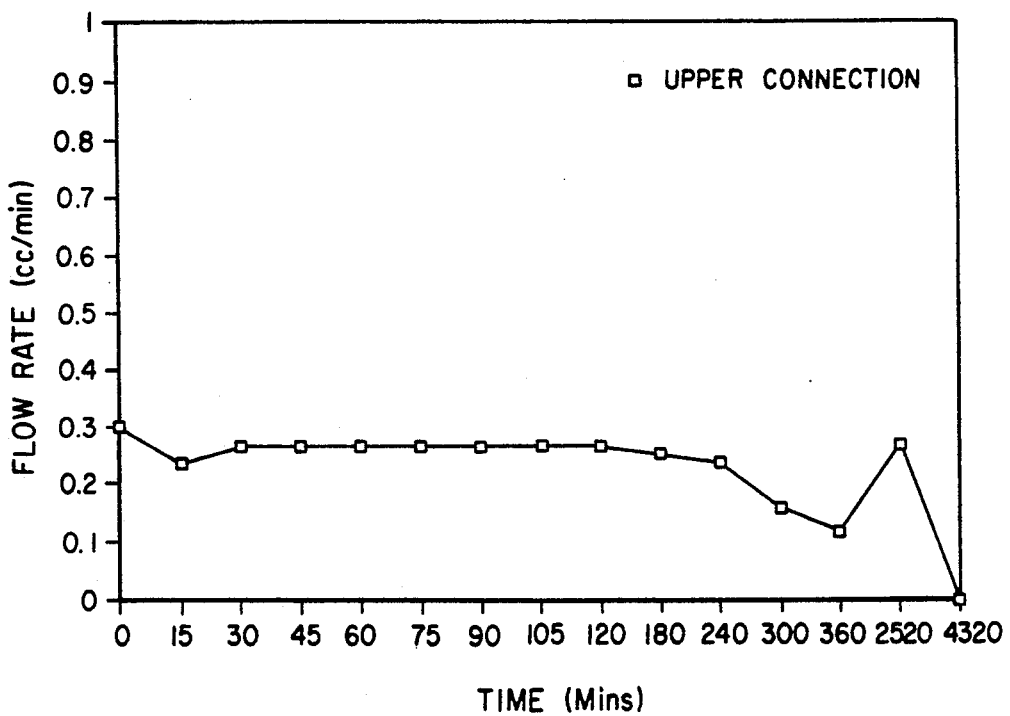

FIG. 6 illustrates the sealing capability of the aforementioned composition comprising water, sulfonated polystyrene and silica.

The improved effectiveness of the Gilsonite/diesel fuel/surfactant composition is believed to be due, at least in part, to the solubility of the particles of Gilsonite in the carrier liquid. Moreover, any particles which do not completely solubilize may be subject to plastic deformation and withstand changes in differential pressure in the leak area without losing sealing capability. Examination of the thread seal area indicates that a plating action takes place as the sealant composition flows through the leakage space wherein the gas leakage flow tends to evaporate or otherwise separate the diesel fuel, leaving a hard, waxy residue in the thread area as the injection gas strips the diesel fuel component from the solution. This action significantly reduces or eliminates gas migration through small leakage spaces, such as between the threads of couplings and casing sections. Although examples given herein were for single treatments of leakage from threaded couplings, multiple treatments might be necessary in high leakage conditions.

An example is given hereinbelow of an effort to seal casing leakage in an oil well located in an Alaska North Slope oil field.

EXAMPLE

An Alaskan North Slope oil well, producing crude oil on artificial gas lift, was injected with a composition according to the present invention to reduce gas leakage between the inner casing, such as the casing 18 in the exemplary well of FIG. 1 and the outer casing 14. Preparatory to injecting the leak sealant of the present invention, the sealant was mixed at a drill site maintenance facility in a 40-barrel mixing plant comprising an eductor-type hopper for adding particulate materials, a $5' \times 5' \times 10'$ tank and a centrifugal circulating and mixing pump. Twenty barrels of arctic diesel were pumped into the mixing plant tank at a temperature in excess of 50° F. The circulating pump was operated to agitate the diesel fuel, and surfactant in the form of IGEPAL RC-520, in liquid form, was added to the tank in the amount of 66 gallons of surfactant for the 20-barrel batch of diesel fuel. Diesel fuel and surfactant were mixed for 15 minutes.

For the above-mentioned mixture, twelve 50-lb. sacks of Select 300 super-fine Gilsonite, from American Gilsonite Company, was added at a rate of about five to ten minutes per sack through the eductor-type hopper. The average particle size of this specific composition is about 0.5 microns. The entire mixture was allowed to shear by circulation through the centrifugal pump for about 3 hours to facilitate solubilization of the Gilsonite in the diesel fuel. A sample of the mixture was periodically collected in a small container and pipetted from the container dropwise on different areas of Whatman 54 or 541 filter paper to determine when the Gilsonite had completely solubilized.

A well having an outer casing of 13 ⅜ inch diameter and an inner casing of 9 ⅝ inch diameter, operating at a gas lift injection rate of 1.5 to 0.80 mmcf/day at 125° F. and 1730 to 1670 psig injection pressure was treated by injecting the above-mentioned mixture at a rate of 6 to 7 gallons per minute into the injection gas supply conduit just upstream of the wellhead. Prior to injection of the sealant, the annulus outside the outer casing was at an initial pressure of 1200 psig and bled down to an annulus pressure of about 22 psig to maximize the differential pressure across the casing couplings. A total of eight barrels of sealant was injected into the aforementioned well over a vertical length of about 2,200 feet. After injection of the sealant, the maximum pressure in the annulus decreased to only 6.0 psig during injection and remained at 0 psig after total bleed down.

As indicated from the foregoing, unique sealant compositions for sealing small leaks in conduits and the like have been developed in accordance with the present invention. In particular, providing a sealant comprising a surfactant of the type described above, particulate Gilsonite and a carrier liquid, such as diesel fuel, wherein the surfactant and Gilsonite were both added at concentrations of about 10% by weight of the diesel fuel resulted in a significant reduction in leakage rate. The formulation of the sealant composition and the placement technique are especially suitable for arctic environments, although other applications may benefit as well from the unique sealant composition and method. Moreover, commercially available materials may be used in making up the composition. It is contemplated that other particulates may be substituted for the Gilsonite such as other hydrocarbon resins which solubilize in the carrier liquid. However, particulate Gilsonite is believed to be superior to particulates such as silica alone or other particulates such as sulfonated polystyrene. Evaluation of the compositions described herein also indicates that the surfactant may be provided in a range of 2% to 15% by weight with respect to the carrier liquid, and the sealant particulate material may be suitably provided in a weight range of 5% to 30% with respect to the carrier liquid. A solubilized sealant material is also believed to be more effective in sealing small leakage spaces and wherein the carrier liquid must flow against the forces of gravity, such as in flowing through the upper casing-to-coupling connection when the carrier liquid and gas stream have been injected from above and the sealant composition is required to flow down the casing walls before entering the so-called "J" area of the coupling threads.

Although preferred embodiments of the present invention have been described hereinabove, those skilled in the art will recognize that various substitutions and modifications may be made to the invention without departing from the scope and spirit of the appended claims.

What we claim is:

1. A sealant composition for sealing leaks in threaded connections in an oil well casing or conduit under gas injection comprising:
   a carrier liquid, a surfactant and a hydrocarbon resin, said sealant composition being entrainable in injection gas to be carried by said injection gas through said casing or conduit, said carrier liquid being strippable from said hydrocarbon resin by injection gas to form a wax-like coating on said threaded connections to effect a substantially gas-tight seal in said threaded connections.

2. The composition set forth in claim 1 wherein: the hydrocarbon resin is Gilsonite.

3. The composition set forth in claim 2 wherein: the carrier liquid is diesel fuel.

4. The composition set forth in claim 3 wherein: the surfactant is an ethoxylated phenol.

5. A sealant composition for entrainment in a gas flowstream to seal small leaks in at least one of threaded connections and other leakage paths in conduits and the like, said composition comprising a hydrocarbon carrier liquid, a surfactant and a particulate material comprising a hydrocarbon resin at least partially soluble in said carrier liquid, and said carrier liquid being strippable from said hydrocarbon resin by said gas flowstream as said composition passes into said leaks to form a substantially gas tight seal at said leaks in said at least one of said threaded connections and said other leakage paths.

6. The composition set forth in claim 1 wherein: the carrier liquid is diesel fuel, and the particulate material is Gilsonite.

7. The composition set forth in claim 6 wherein: the particle size of the particulate material is less than about 5.0 microns.

8. The composition set forth in claim 1 wherein: the surfactant is an ethoxylated phenol.

9. The composition set forth in claim 1 wherein: the particulate material is provided in a range of about 5% to 30% by weight with respect to the carrier liquid.

10. The composition set forth in claim 9 wherein: the weight ratio of the carrier liquid to the particulate material is not more than about 10:1.

11. The composition set forth in claim 1 wherein: the surfactant is provided in a range of about 2% to 15% by weight with respect to the carrier liquid.

12. The composition set forth in claim 11 wherein: the weight ratio of the carrier liquid to the surfactant is not more than about 10:1.

13. A method of sealing leaks in threaded connections and similar small leaks from gas leakage in a tubular conduit, such as an oil well casing or the like, comprising the steps of:
    providing a gas entrainable sealant composition comprising a carrier liquid and a particulate material selected from one of silica and Gilsonite; and
    injecting said sealant composition into a gas flowstream in said well and flowing said sealant composition with said gas flowstream to wet said threaded connections and enter the thread spaces therebetween to form a substantially gas-tight seal in said thread connections.

14. The method set forth in claim 13 wherein:

said well comprises an oil well producing crude oil with artificial lift by gas injection and said method includes the step of injecting measured quantities of said sealant composition into said gas prior to injecting said gas into said well.

15. A method for sealing gas leaks in threaded connections between sections of tubular conduit comprising the steps of:

providing a gas entrainable sealant composition comprising a carrier liquid and a particulate material which is at least partially soluble in the carrier liquid; and injecting said sealant composition into a gas flowstream flowing within said conduit to atomize said sealant composition, and flowing said sealant composition with said gas flowstream to wet said threaded connections and enter the thread spaces therebetween to deposit said particulate material in said threaded connections to form a substantially gas tight seal in said threaded connections.

* * * * *